US010107340B1

(12) United States Patent
Samie et al.

(10) Patent No.: US 10,107,340 B1
(45) Date of Patent: Oct. 23, 2018

(54) DEVICE FOR ACTIVATING A LOW-FRICTION CLUTCH

(71) Applicant: GM GLOBAL TECHNOLOGY OPERATIONS LLC, Detroit, MI (US)

(72) Inventors: Farzad Samie, Franklin, MI (US); Tito R. Huffman, Eastpointe, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/479,368

(22) Filed: Apr. 5, 2017

(51) Int. Cl.
*F16D 27/08* (2006.01)
*F16D 27/14* (2006.01)

(52) U.S. Cl.
CPC .............. *F16D 27/08* (2013.01); *F16D 27/14* (2013.01)

(58) Field of Classification Search
None
See application file for complete search history.

(56) References Cited

U.S. PATENT DOCUMENTS

| 4,840,543 | A | * | 6/1989 | Geberth, Jr. | .......... F16D 27/112 192/107 R |
| 5,370,511 | A | * | 12/1994 | Strikis | ..................... F04C 28/06 192/84.2 |
| 6,098,770 | A | * | 8/2000 | Isley, Jr. | ................ F16D 27/115 192/35 |
| 7,731,006 | B2 | * | 6/2010 | Settineri | ................ F16D 25/082 192/110 B |
| 2006/0124332 | A1 | * | 6/2006 | Greese | ..................... B25B 23/14 173/178 |
| 2007/0227851 | A1 | * | 10/2007 | Tarasinski | ............... F16D 23/06 192/48.2 |
| 2009/0183963 | A1 | * | 7/2009 | Swanson | ............. F16D 25/0632 192/48.2 |
| 2010/0025131 | A1 | * | 2/2010 | Gloceri | ..................... B60G 3/20 180/65.28 |
| 2012/0031086 | A1 | * | 2/2012 | Bell | ....................... F16D 25/088 60/327 |
| 2013/0334001 | A1 | * | 12/2013 | Albrecht | .................. F16D 11/14 192/69.7 |
| 2014/0116180 | A1 | * | 5/2014 | Keller | ...................... F16D 11/10 74/473.36 |
| 2015/0292576 | A1 | * | 10/2015 | Settineri | ............. F16D 65/0018 192/48.2 |
| 2015/0345572 | A1 | * | 12/2015 | Hosokawa | .............. F16D 27/14 192/101 |

(Continued)

*Primary Examiner* — Jacob S. Scott
*Assistant Examiner* — Timothy Hannon
(74) *Attorney, Agent, or Firm* — Quinn IP Law

(57) ABSTRACT

A device is configured to control activation of a low-friction clutch, wherein the low-friction clutch includes a first member coaxial to a second member and a controllable activation device interposable therebetween. The device includes a piston that is mechanically coupled to the activation device, a spring that is disposed to urge the piston in a first direction, a controllable electrical coil disposed adjacent to the piston. The electrical coil is disposed to generate an electro-magnetic force to urge the piston in a second direction that is opposed to the first direction when activated, and the spring and the electrical coil interact with the piston to selectively mechanically couple the first and second members via the controllable activation device.

17 Claims, 2 Drawing Sheets

(56) References Cited

U.S. PATENT DOCUMENTS

| | | | |
|---|---|---|---|
| 2015/0380144 A1* | 12/2015 | Heravi | F16B 48/064 |
| | | | 361/139 |
| 2016/0131206 A1* | 5/2016 | Essennnacher | F16D 48/064 |
| | | | 192/84.1 |
| 2017/0159809 A1* | 6/2017 | Nakashima | F16F 15/1478 |

* cited by examiner

DEVICE FOR ACTIVATING A LOW-FRICTION CLUTCH

INTRODUCTION

Low-friction clutch devices minimize energy losses related to rotational friction when disengaged.

SUMMARY

As described here, a device is configured to control activation of a low-friction clutch, wherein the low-friction clutch includes a first member coaxial to a second member and a controllable activation device interposable therebetween. The device includes a piston that is mechanically coupled to the activation device, a spring that is disposed to urge the piston in a first direction, a controllable electrical coil disposed adjacent to the piston. The electrical coil is disposed to generate an electro-magnetic force to urge the piston in a second direction that is opposed to the first direction when activated, and the spring and the electrical coil interact with the piston to selectively mechanically couple the first and second members via the controllable activation device.

An aspect of the disclosure includes the spring and the electrical coil disposed to interact with the piston to mechanically couple the first and second members via the controllable activation device when the electrical coil is deactivated.

Another aspect of the disclosure includes the spring and the electrical coil interacting with the piston to mechanically decouple the first and second members via the controllable activation device when the electrical coil is activated.

Another aspect of the disclosure includes the spring and the electrical coil interacting with the piston to mechanically decouple the first and second members via the controllable activation device when the electrical coil is deactivated.

Another aspect of the disclosure includes the spring and the electrical coil interacting with the piston to mechanically couple the first and second members via the controllable activation device when the electrical coil is activated.

Another aspect of the disclosure includes the activation device being a moveable slipper that is interposable between the first and second members.

Another aspect of the disclosure includes the activation device being a strut that is configured to fit and lock into a corresponding pocket.

Another aspect of the disclosure includes the second member being a brake.

Another aspect of the disclosure includes the second member being a rotating device.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as left, right, inner and outer may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
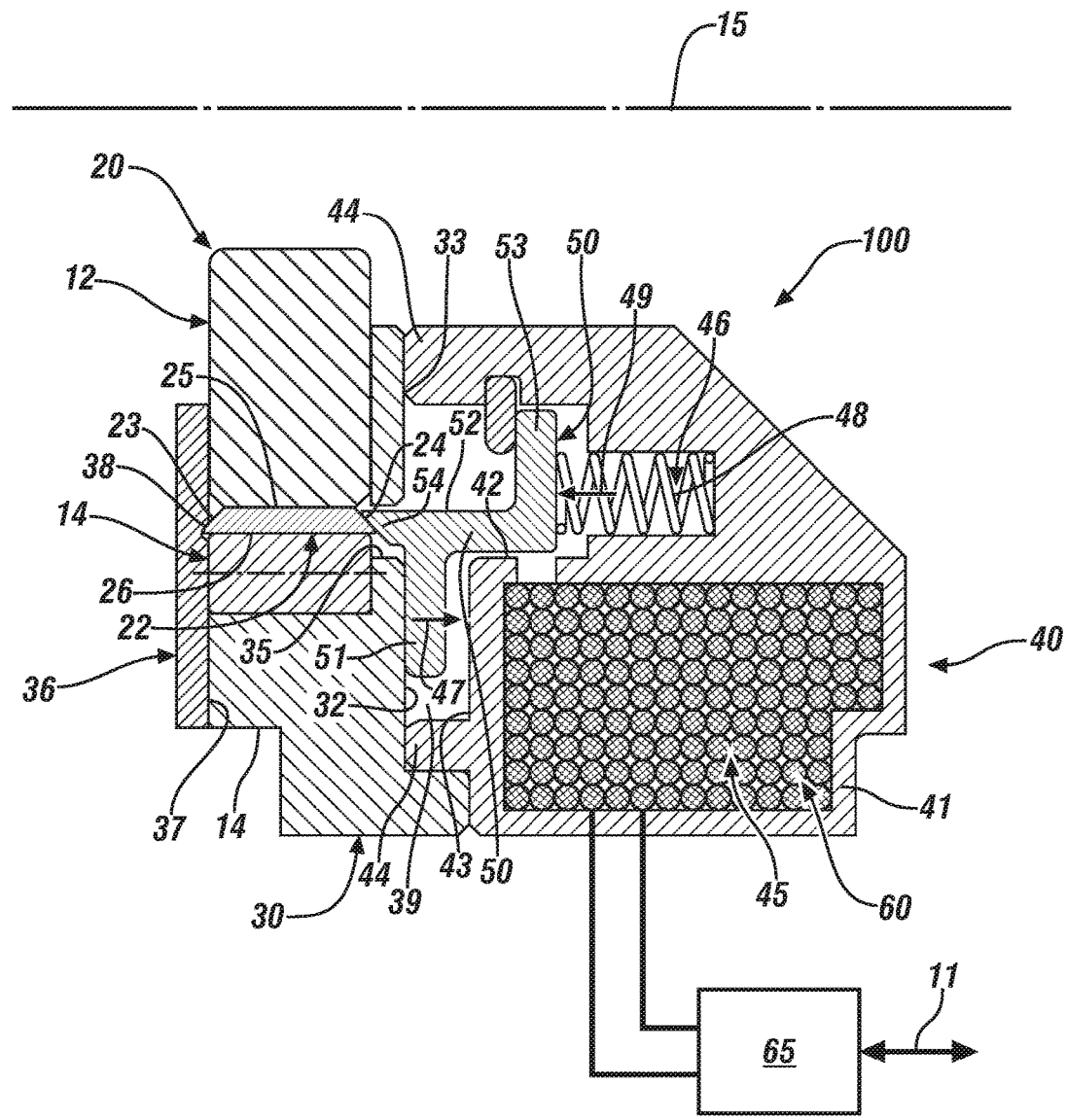
FIG. 1 schematically illustrates a cross-sectional side-view of an embodiment of a portion of a geartrain that includes a clutch and a clutch actuator assembly that are configured to transfer mechanical rotational power between a first member and a second member, in accordance with the disclosure.

Referring to the drawings, wherein like reference numerals correspond to like or similar components throughout the several Figures, FIG. 1, consistent with embodiments disclosed herein, illustrates a cross-sectional side-view of a portion of a geartrain 100 that includes a clutch 20 and a clutch actuator assembly 40 that are configured to transfer mechanical rotational power between a first member 12 and a second member 14, such as may be employed in a powertrain system of a vehicle in one embodiment. The vehicle may include, but not be limited to a mobile platform in the form of a commercial vehicle, an industrial vehicle, an agricultural vehicle, a passenger vehicle, an aircraft, a watercraft, a train, an all-terrain vehicle, a personal movement apparatus, a robot and the like to accomplish the purposes of this disclosure.

The first and second members 12, 14 are concentric, annular devices that are arranged about a longitudinal axis 15. In one embodiment, the first member 12 is a rotating member that is coupled to an input member for a torque transmission device and the second member 14 is a rotating member that is coupled to a crankshaft of an internal combustion engine. Alternatively, either the first member 12 or the second member 14 may be a ground member, such as a transmission case, and activation of the clutch 20 may be executed to ground or stop rotation of the other member, i.e., the second member 14 or the first member 12.

The clutch 20 is preferably configured as a low-friction clutch, which includes coaxial low friction clutch elements that can be selectively mechanically coupled by an interposed activation device 22. The clutch 20 is characterized by a zero-slip, positive coupling between the members when activated, and exhibits low inertia, minimal drag and no backlash when deactivated. In this embodiment, the clutch 20 is configured as a wedge-actuated bi-directional clutch device that is disposed in a clutch housing 30 and includes the activation device 22 in the form of a moveable slipper that can be interposed between the first and second members 12, 14. The clutch housing 30 is an annular device having a first radial face 32, a second radial face 33 and a cutout portion 37. The first radial face 32 is disposed adjacent to the clutch actuator assembly 40, and includes an aperture 35 that is disposed to accommodate a wedge portion 54 of a piston 50. A clutch cover plate 36 is an annular device having a triangular-shaped notch 38 that is located on its inner surface at a radial distance from the longitudinal axis 15 that accommodates a first wedge 23 of the activation device 22. The first and second members 12, 14 are concentric elements that are inserted between the clutch housing 30 and the clutch cover plate 36 with the activation device 22 interposed therebetween. The aperture 35 of the first radial face 32 and the triangular-shaped notch 38 of the clutch cover plate 36 are disposed at a common radial distance from the longitudinal axis 15 to accommodate the activation device 22. The activation device 22 is an annular device having a cross-sectional shape that is preferably configured as an isosceles trapezoid wherein a length of a lower base 26 of the trapezoid is greater than a length of an upper base 25 of the trapezoid, thus forming first and second wedges 23 and 24, respectively, on the opposed ends thereof.

The clutch actuator assembly 40 includes a housing 41 that includes a first bearing surface 42 that is parallel to the longitudinal axis 15, a second bearing surface 43 that is perpendicular to the longitudinal axis 15, and spacers 44. The configuration of the housing 41 forms void areas that include a first space 45 and a second space 46. The first space 45 is configured as a housing for the electrical coil 60, which is assembled and inserted therein. A mechanical spring 48 is disposed in the second space 46. The electrical coil 60 is preferably formed from an electrical conductor, such as a copper wire, that is wound. The electrical coil 60 acts as an inductor that generates electro-magnetic force when electrical current flows through it. The electrical coil 60 is electrically connected to an electrical power supply 65, e.g., a current driver that is preferably controlled by an on-board controller (not shown). In one embodiment, the electrical coil 60 and electrical power supply 65 are low-voltage devices that are supplied electric power from a low-voltage power source, such as a 12 Vdc power supply. In one embodiment, the mechanical spring 48 is a device that exerts a mechanical force in a direction in response to a load, such as, by way of a non-limiting example, a helical-shaped device formed from spring steel or another resilient material.

The piston 50 is a rigid device having a body portion 52 that is parallel with the longitudinal axis 15, a first, radially-outward leg 51 near a first end of the body 52, second, radially-inward leg 53 near a second end of the body 52, and the wedge portion 54, which is disposed on the first end of the body 52. The piston 50 may be fabricated from suitable materials. However, at least the first leg 51 is fabricated from or otherwise includes ferro-magnetic materials. The first radial face 32 of the clutch housing 30 is disposed adjacent to the spacers 44 of the clutch actuator assembly 40 and forms a void space 39 in which the piston 50 is inserted and is able to translate along the longitudinal axis 15. The spring 48 is disposed in the second space 46 to exert a force on the second leg 53 of the piston 50 to urge the piston 50 in a first direction 49. The first leg 51 of the piston 50 is disposed in the void space 39.

When the piston 50 is urged in the first direction 49, the wedge portion 54 of the piston 50 interacts with the wedge 24 of the activation device 22, which urges the activation device 22 away from the first member 12, thus permitting the first member 12 to rotate freely apart from the second member 14. When the piston 50 is urged in a second direction 47, the wedge portion 54 of the piston 50 no longer interacts with the wedge 24 of the activation device 22, and the activation device 22 interferes between the first member 12 and the second member 14, thus causing the first member 12 to rotate in concert with the second member 14, or alternatively, braking the first member 12 with the second member 14 when the second member 14 is a ground such as a transmission case.

Activation and deactivation of the clutch 20 is achieved by interactions of the piston 50, the spring 48 and the controllable electrical coil 60. The piston 50 is mechanically coupled to the activation device 22. The spring 48 is disposed to urge the piston 50 in the first direction 49 that is towards the clutch 20 and away from the electrical coil 60, as indicated by a first arrow. The electrical coil 60 is disposed adjacent to the piston 50, and is controllable to generate an electro-magnetic force that urges the piston in the second direction 47 that is opposed to the first direction 49 when activated. The second direction 47 is indicated by a second arrow.

The first and second members 12, 14 are mechanically coupled via the activation device 22 when the piston 50 is urged in the first direction 49, which is a default state. As such, the clutch 20 is activated when in the default or non-powered state in one embodiment. Alternatively, the clutch 20 can be configured to be deactivated when in the default state. In this embodiment, the first and second members 12, 14 are mechanically coupled via interposing of the activation device 22 when the electrical coil 60 is activated. The first and second members 12, 14 are mechanically decoupled when the piston 50 is urged in the second direction 47, which moves the activation device 22 so that it is not interposed between the first and second members 12, 14. In this embodiment, the first and second members 12, 14 are mechanically decoupled via the force of the spring 48 acting on the activation device 22 when the electrical coil 60 is deactivated.

In this embodiment, the clutch 20 may be a wedge-actuated bi-directional clutch device that is disposed in a clutch housing 30 and includes the activation device 22 in the form of a moveable slipper 22 that can be interposed between the first and second members 12, 14. In one embodiment, first member 12 may be a portion of a clutch device and the second member 14 may be a roller. When the moveable slipper 22 is disposed in a first position (as shown in FIG. 1) by action of the clutch 20 and the clutch actuator assembly 40, the moveable slipper 22 causes the first member 12 to rotatably engage the second member 14, causing the first and second members 12, 14 to rotate in concert. The first position is a default position, as shown, wherein the electrical coil 60 is deactivated. In one embodiment, the second member 14 may be a case ground, thus acting to ground rotation of the first member 12 when it is engaged with the second member 14. When the moveable slipper 22 is disposed in a second position (not shown), the moveable slipper 22 causes the first member 12 to disengage the second member 14, allowing the first member 12 to rotate freely. One advantage of this clutch configuration is that friction losses between the first and second members 12, 14 are minimized when they are disengaged.

Figure 2:
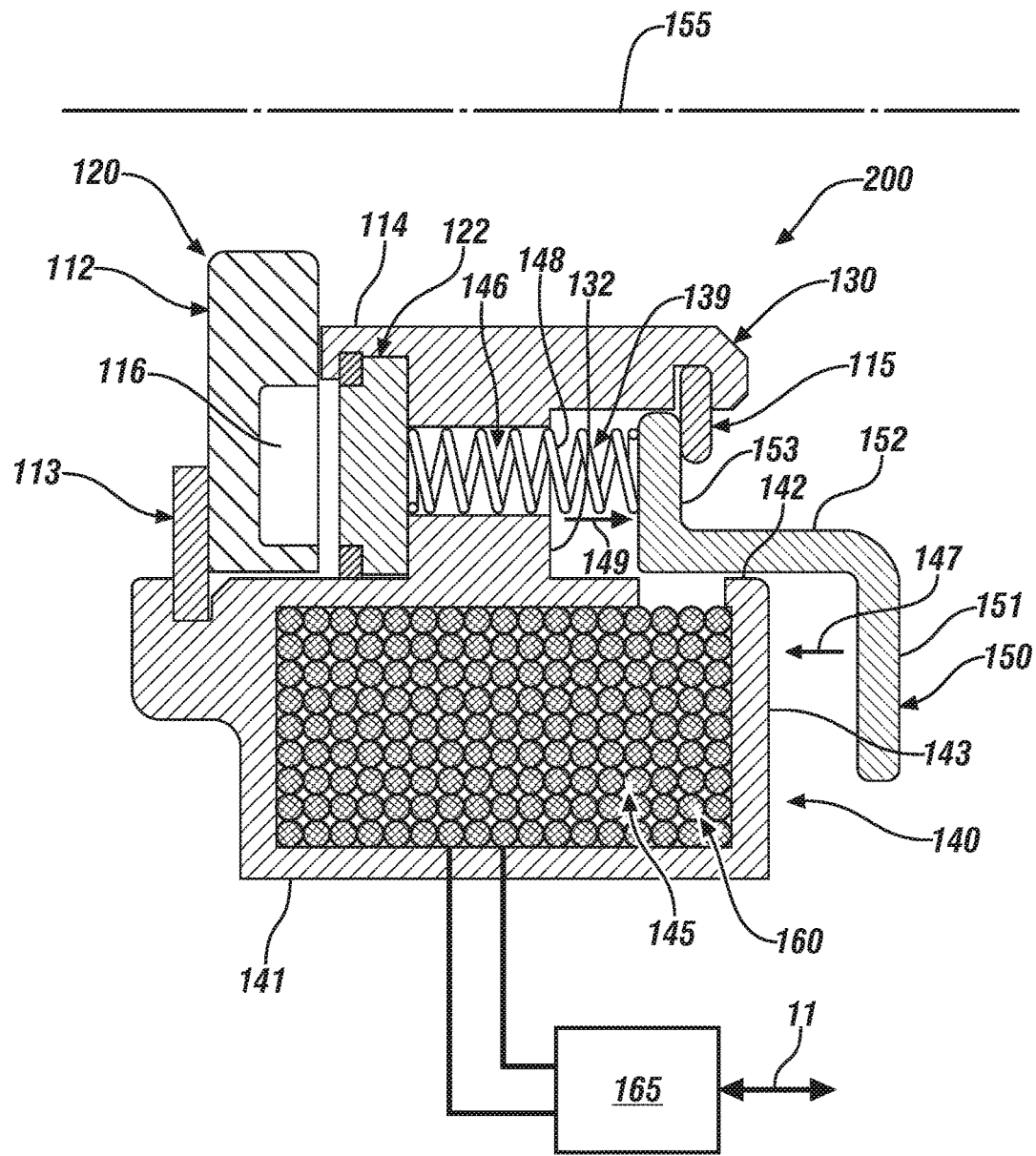
FIG. 2 schematically illustrates a cross-sectional side-view of another embodiment of a portion of a geartrain that includes a clutch and a clutch actuator assembly that are configured to transfer mechanical rotational power between a first member and a second member, in accordance with the disclosure.

FIG. 2 illustrates a cross-sectional side-view of a portion of a second embodiment of a geartrain 200 that includes a clutch 120 and a clutch actuator assembly 140 that are configured to transfer mechanical rotational power between a first member 112 and a second member 114, such as may be employed in a powertrain system of a vehicle in one embodiment. The first and second members 112, 114 are opposed annular devices that are arranged about the longitudinal axis 155. In one embodiment, the first member 112 is a rotating member that is coupled to an input member for a torque transmission device and the second member 114 is a rotating member that is coupled to a crankshaft of an internal combustion engine. Alternatively, either the first member 112 or the second member 114 may be a ground member, such as a transmission case, and activation of the clutch 120 may be executed to ground or stop rotation of the other member, i.e., the second member 114 or the first member 112.

The clutch 120 is preferably configured as a low-friction clutch, which includes coaxial low friction clutch members that can be selectively mechanically coupled by an interposed activation device 122. The clutch 120 is characterized by a zero-slip, positive coupling between the members when activated, and exhibits low inertia, minimal drag and no backlash when deactivated. In this embodiment, the first and second members 112, 114 are opposed races of a one-way clutch arrangement that are selectively rotatably coupled by insertion of the activation device 122 associated with the second member 114 into a corresponding pocket 116 that is disposed on the first member 112 to lock or otherwise couple their rotations.

The clutch 120 and clutch actuator assembly 140 are disposed in a housing 130 that includes a first radial face 132, a second radial face 143 and a cutout space 146. The housing 130 includes a first recess portion that accommodates a first retaining ring 115 that is disposed to retain a piston 150, and a second recess portion that accommodates a second retaining ring 113 that is disposed to retain the clutch 120. The activation device 122 is a strut that is configured to fit and lock into a corresponding pocket 116. The clutch actuator assembly 140 includes a coil housing 141 of the housing 130 and includes a first bearing surface 142 that is parallel to the longitudinal axis 155 and a second bearing surface 143 that is perpendicular to the longitudinal axis 155. The coil housing 141 forms void areas that include a first space 145 that is configured as a housing for the electrical coil 160, which is assembled and inserted therein. A mechanical spring 148 is disposed in the cutout space 146. The electrical coil 160 is preferably formed from an electrical conductor, such as a copper wire, that is wound. The electrical coil 160 acts as an inductor that generates electro-magnetic force when electrical current flows through it, including in the direction of the second radial face 143. The electrical coil 160 is electrically connected to an electrical power supply 165, e.g., a current driver that is preferably controlled by an on-board controller (not shown). In one embodiment, the electrical coil 160 and electrical power supply 165 are low-voltage devices that are supplied electric power from a low-voltage power source, such as a 12 Vdc power supply. In one embodiment, the mechanical spring 148 is a device that exerts a mechanical force in a direction in response to a load, such as, by way of a non-limiting example, a helical-shaped device formed from spring steel or another resilient material.

The piston 150 is a rigid device having a body portion 152 that is parallel with the longitudinal axis 155, a first, radially-outward leg 151 near a first end of the body 152, and a second, radially-inward leg 153 near a second end of the body 152. The piston 150 may be fabricated from suitable material. However, at least the first leg 151 is fabricated from or otherwise includes ferro-magnetic materials.

The spring 148 is disposed in the cutout space 146 to exert an expansion force between the second leg 152 of the piston 150 and the activation device 122. As shown, the piston 150 is in a first position (as shown) with the second leg 153 of the piston 150 disposed at a first end of a void space 139, which is rightward as shown. When the piston 150 is in the first position, the spring 148 is in a substantially relaxed state, and is exerting minimal expansion force between the piston 150 and the activation device 122, thus permitting the first member 112 to rotate freely apart from the second member 114. The first position is a default position, as shown, wherein the electrical coil 160 is deactivated and the clutch 120 is disengaged or deactivated.

When the piston 150 is urged to a second position (not shown), the second leg 153 of the piston 139 is urged towards a second end of the void space 139 by activation of the electrical coil 160, which is leftward as shown. When the piston 150 is in the second position, the spring 148 is in a compressed state, and is exerting a substantial expansion force between the piston 150 and the activation device 122, which urges the activation device 122 to engage the corresponding pocket 116, thus coupling rotation of the first and second members 112, 114, or alternatively, braking the first member 112 with the second member 114 when the second member 114 is a ground such as a transmission case. Alternatively, the clutch 120 can be configured to be activated when in the default state.

Activation and deactivation of the clutch 120 is achieved by interactions of the piston 150, the spring 148 and the controllable electrical coil 160. The piston 150 is mechanically coupled to the activation device 122 via the spring 148. The electrical coil 160 is disposed adjacent to the first leg 151 of the piston 150, and is controllable to generate an electro-magnetic force that urges the piston 150 in the second direction 147 that is opposed to the first direction 149 when activated. The second direction 147 is indicated by a second arrow.

The first and second members 112, 114 are mechanically coupled via the activation device 122 when the piston 150 is urged in the second direction 147. In this embodiment, the first and second members 112, 114 are mechanically coupled via interposing of the activation device 122 when the electrical coil 160 is activated.

The first and second members 112, 114 are mechanically decoupled when the piston 150 is urged in the first direction 149, which moves the activation device 122 so that it is not interposed between the first and second members 112, 114. In this embodiment, the first and second members 112, 114 are mechanically decoupled via absence of force from the spring 148 acting on the activation device 122 when the electrical coil 160 is deactivated.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s)

and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link, and is indicated herein by line 11. Communication includes exchanging data signals in a suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A device configured to control activation of a low-friction clutch, wherein the low-friction clutch includes a first member coaxial to a second member and a controllable activation device interposable therebetween, the device comprising:
   a piston mechanically coupled to the activation device, wherein the piston includes a wedge portion;
   a spring disposed to urge the piston in a first direction; and
   a controllable electrical coil disposed adjacent to the piston;
   wherein the activation device includes an annular device including a moveable slipper having a trapezoidal cross-section including wedges disposed on opposite ends thereof;
   wherein the electrical coil is disposed to generate an electro-magnetic force to urge the piston in a second direction that is opposed to the first direction when activated; and
   wherein the spring and the electrical coil interact with the piston to engage the wedge portion of the piston with one of the wedges of the moveable slipper to urge the controllable activation device to a first position to mechanically positively couple the first and second members in a zero-slip state.

2. The device of claim 1, wherein the spring and the electrical coil interact with the piston to mechanically couple the first and second members via the controllable activation device when the electrical coil is deactivated.

3. The device of claim 1, wherein the spring and the electrical coil interact with the piston to mechanically decouple the first and second members via the controllable activation device when the electrical coil is activated.

4. The device of claim 1, wherein the spring and the electrical coil interact with the piston to mechanically decouple the first and second members via the controllable activation device when the electrical coil is deactivated.

5. The device of claim 1, wherein the spring and the electrical coil interact with the piston to mechanically couple the first and second members via the controllable activation device when the electrical coil is activated.

6. The device of claim 1, wherein the second member is a brake.

7. The device of claim 1, wherein the second member is a rotating device.

8. The device of claim 1, wherein the spring and the electrical coil interact with the piston to selectively mechanically couple the first and second members via the controllable activation device when rotational speeds of the first and second members are synchronized.

9. The device of claim 1, further comprising a solenoid driver disposed to control operation of the electrical coil.

10. The device of claim 9, wherein the solenoid driver comprises a low-voltage solenoid driver, wherein the low-voltage solenoid driver is supplied electric power originating from a 12 Vdc power supply.

11. A device configured to control activation of a low-friction clutch, wherein the low-friction clutch includes a first member coaxial to a second member and a controllable activation device interposable therebetween, the device comprising:
   a piston mechanically coupled to the activation device, wherein the piston includes a wedge portion;
   a spring disposed to urge the piston in a first direction; and
   a controllable electrical coil disposed adjacent to the piston, and a solenoid driver disposed to control operation of the electrical coil;
   wherein the activation device includes an annular device including a moveable slipper having a trapezoidal cross-section including wedges disposed on opposite ends thereof;
   wherein the solenoid driver is disposed to control operation of the electrical coil to generate an electro-magnetic force that urges the piston in a second direction that is opposed to the first direction when activated; and
   wherein the first and second members are mechanically coupled via the activation device when the piston is urged in the first direction, including the activation device disposed to engage the wedge portion of the piston with one of the wedges of the moveable slipper to urge the controllable activation device in the first direction to couple the first and second members in a zero-slip state.

12. The device of claim 11, wherein the first and second members are mechanically decoupled when the piston is urged in the second direction.

13. The device of claim 11, wherein the spring and the electrical coil interact with the piston to selectively mechanically couple the first and second members via the controllable activation device when rotational speeds of the first and second members are synchronized.

14. A device configured to control activation of a low-friction clutch, wherein the low-friction clutch includes a first member coaxial to a second member and a controllable activation device interposable therebetween, the device comprising:
    a piston mechanically coupled to the activation device;
    a spring disposed to urge the piston in a first direction; and
    a controllable electrical coil disposed adjacent to the piston;
    wherein the second member includes a pocket disposed therein;
    wherein the activation device includes a strut coupled to the first member, wherein the strut is configured to fit and lock into the pocket disposed in the second member;
    wherein the first and second members are mechanically coupled via the activation device when the piston is urged in a first direction, including the activation device disposed to engage the piston to urge the strut in the first direction to engage the pocket to couple the first and second members in a zero-slip state;
    wherein the electrical coil is disposed to generate an electro-magnetic force that urges the piston in a second direction that is opposed to the first direction when activated;
    and
    wherein the first and second members are mechanically decoupled when the electrical coil is activated.

15. The device of claim 14, wherein the activation device is disposed to mechanically couple the first and second members when the electrical coil is deactivated.

16. The device of claim 14, wherein the spring and the electrical coil interact with the piston to mechanically couple the first and second members via the controllable activation device when the electrical coil is deactivated.

17. The device of claim 14, wherein the spring and the electrical coil interact with the piston to mechanically decouple the first and second members via the controllable activation device when the electrical coil is activated.

\* \* \* \* \*